United States Patent [19]
Sweger

[11] 3,941,254
[45] Mar. 2, 1976

[54] WIRE FORM LOCKING MEANS FOR DETACHABLE AIR HOSE COUPLINGS OF RAILWAY CARS

[75] Inventor: Theodore J. Sweger, Lake Worth, Fla.

[73] Assignee: Illinois Railway Equipment Company, Chicago, Ill.

[22] Filed: Dec. 17, 1974

[21] Appl. No.: 533,669

Related U.S. Application Data

[63] Continuation-in-part of Ser. No. 495,320, Aug. 7, 1974, abandoned.

[52] U.S. Cl. .................................. 213/76; 285/69
[51] Int. Cl.² .................................. F16L 35/00
[58] Field of Search ........... 213/1.3, 76; 285/63, 68, 285/69, 25, 114, 320, 308, 309, 310, 311, 312, 321, 82, 87; 24/270, 255 R, 257, 258

[56] References Cited
UNITED STATES PATENTS

| 466,521 | 1/1892 | Fitts | 285/311 |
|---|---|---|---|
| 1,249,074 | 12/1917 | Haldeman | 285/69 |
| 1,619,464 | 3/1927 | Eichorn | 285/69 |
| 3,023,031 | 2/1962 | Dobrikin | 285/69 |
| 3,052,489 | 9/1962 | Stoudt | 285/69 |
| 3,807,774 | 4/1974 | Heath | 285/320 X |
| 3,879,066 | 4/1975 | Kozinski | 285/69 |

Primary Examiner—M. H. Wood, Jr.
Assistant Examiner—Gene A. Church
Attorney, Agent, or Firm—Lockwood, Dewey, Zickert & Alex

[57] ABSTRACT

Air hose couplings for railway cars are prevented from uncoupling by wire form locking means reacting between the body of one coupling and the lip of the other coupling. In certain embodiments a wire form is an integral part of the air hose coupling assembly and has a laterally extending arm for manual unlocking. In another embodiment a detachable bifurcated wire form is applied to coupled air hose couplings after a train is made up and may be discarded when the respective cars are uncoupled. Alternatively, the detachable wire form also can be mounted on the clamp that secures the air hose to the coupling, or on a clamp that fits over the hose clamp, or mounted directly on the main body portion of a coupling.

10 Claims, 35 Drawing Figures

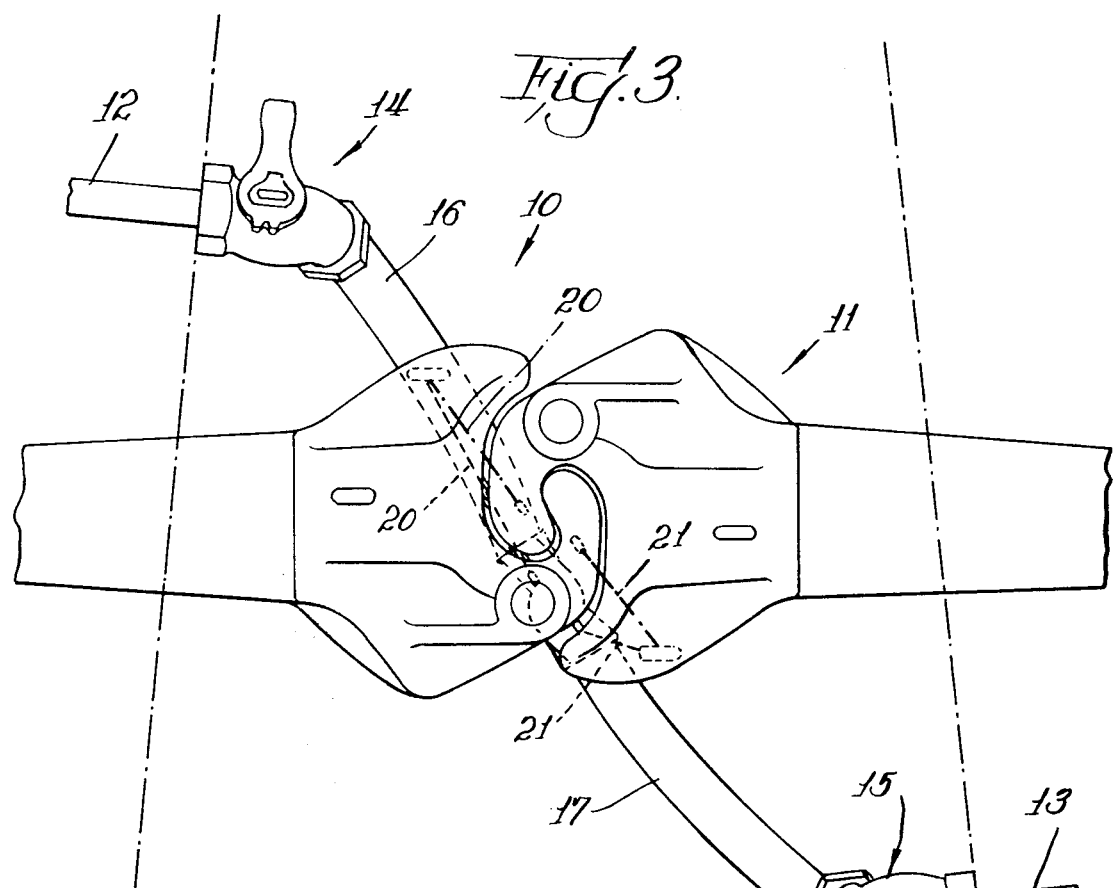
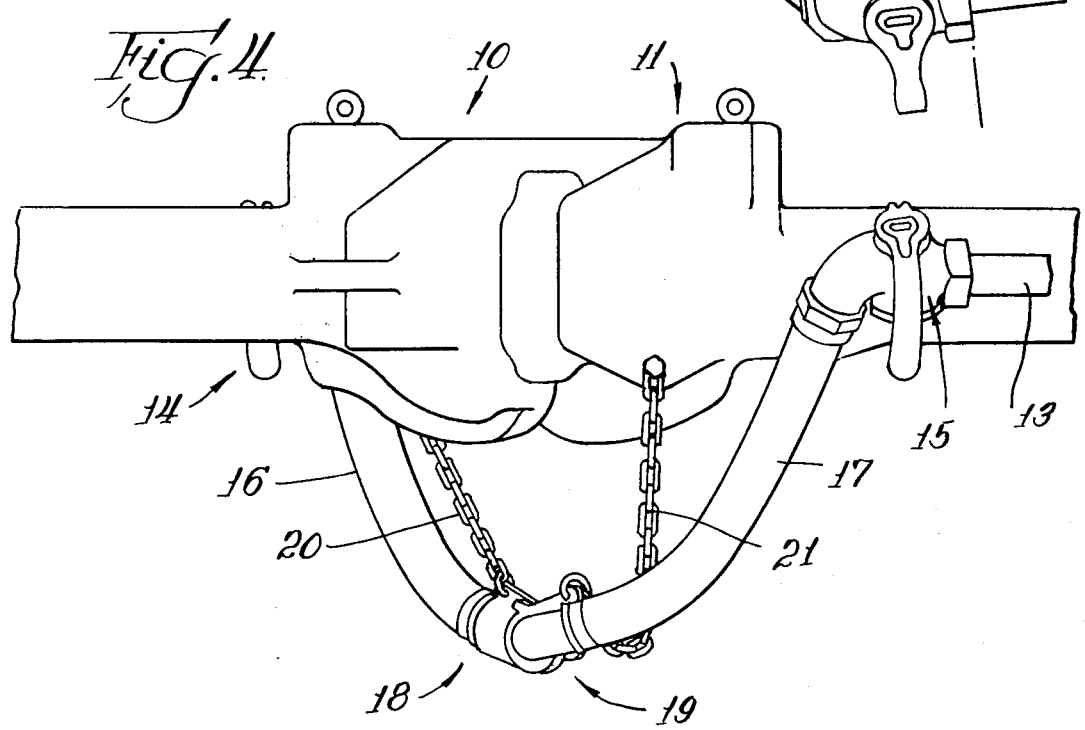

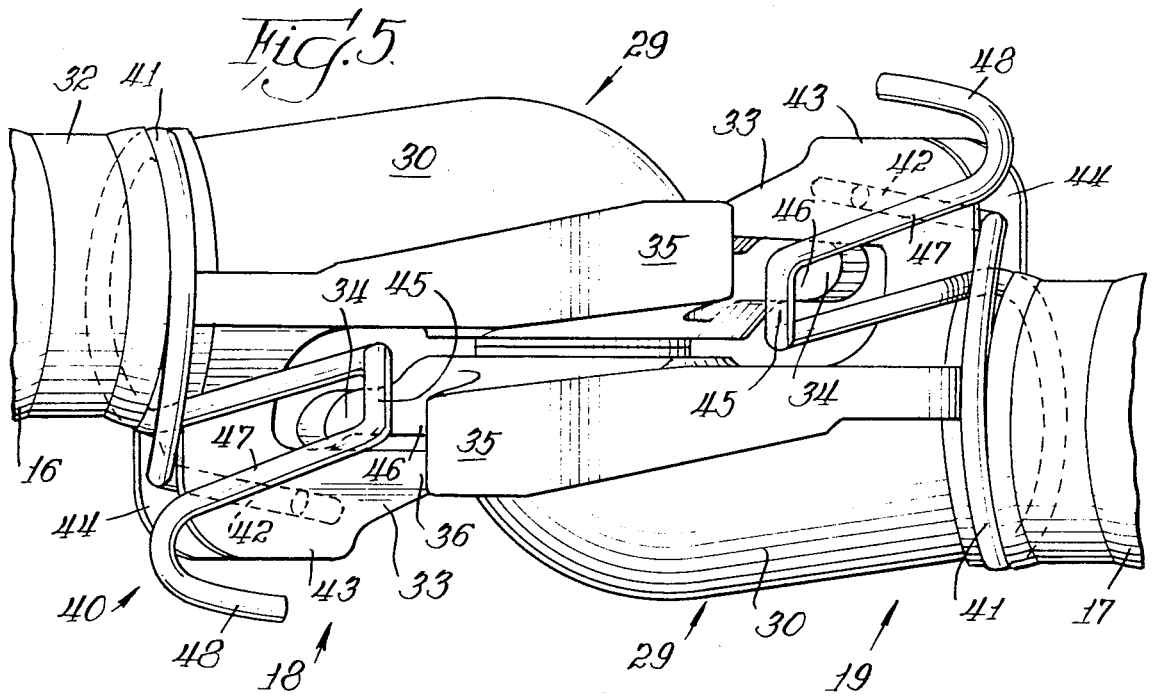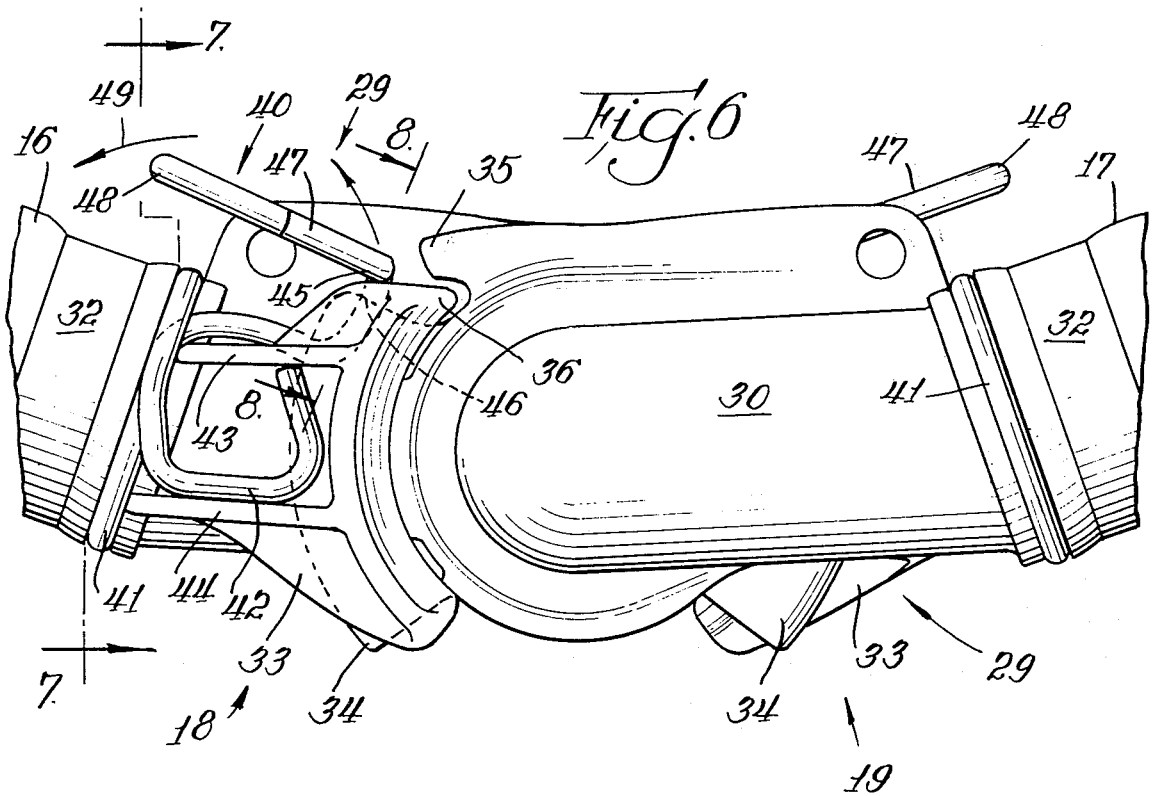

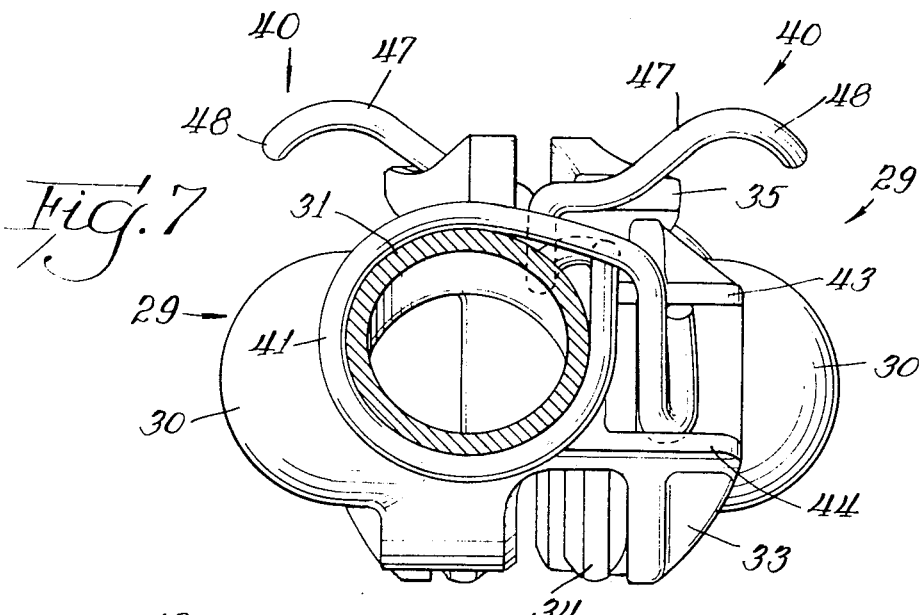
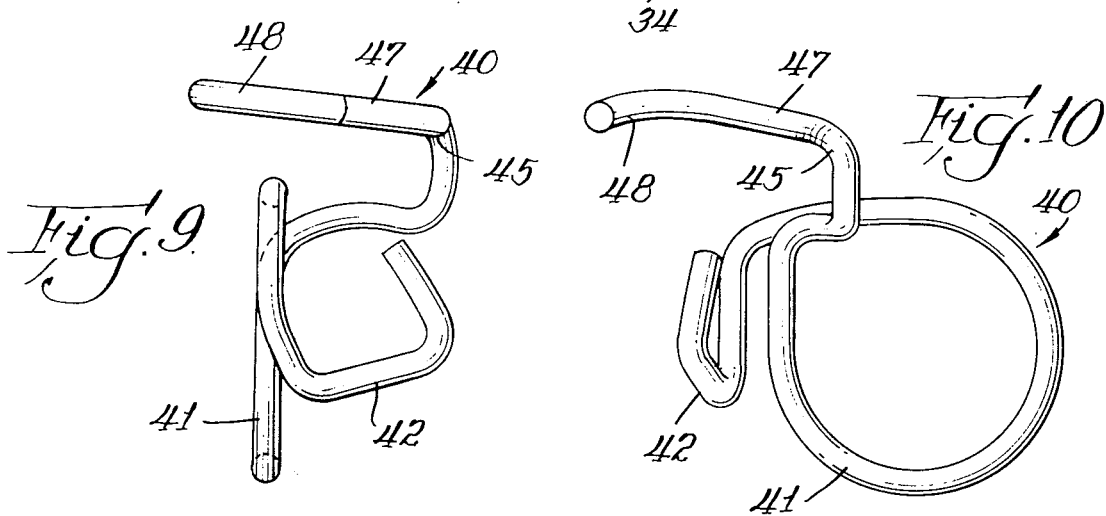
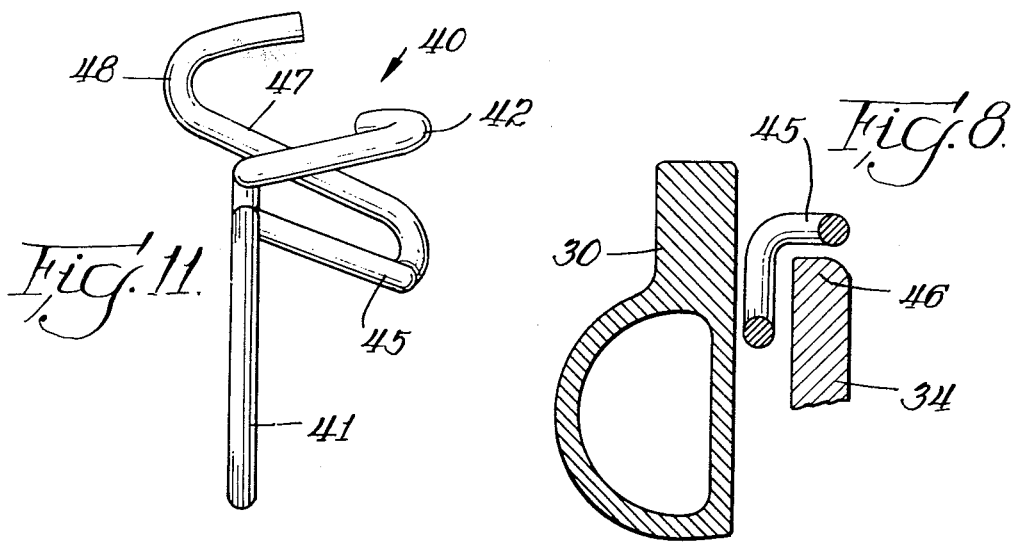

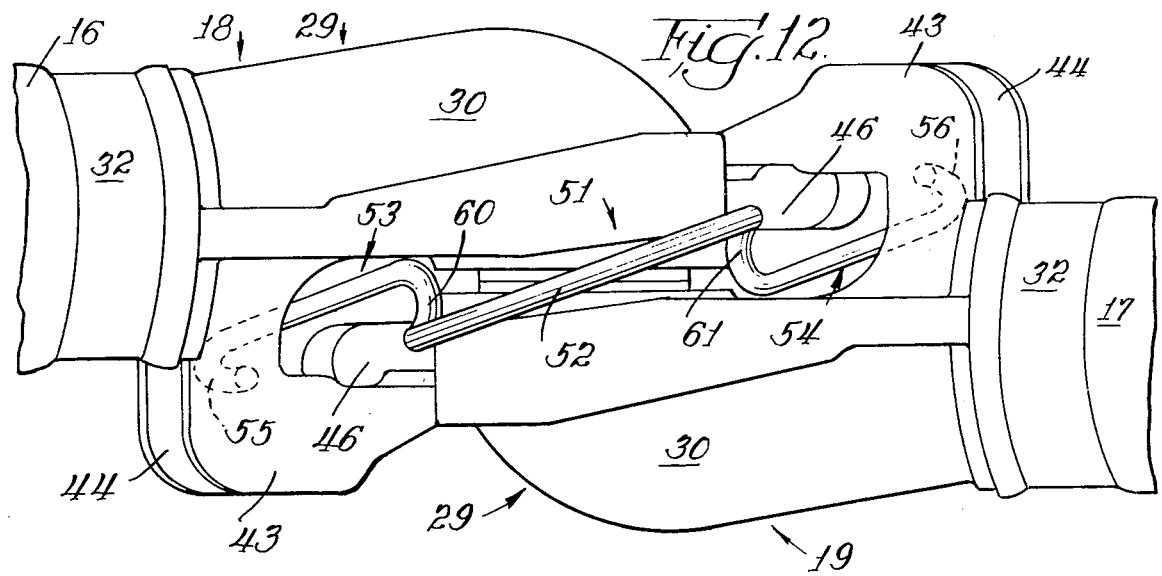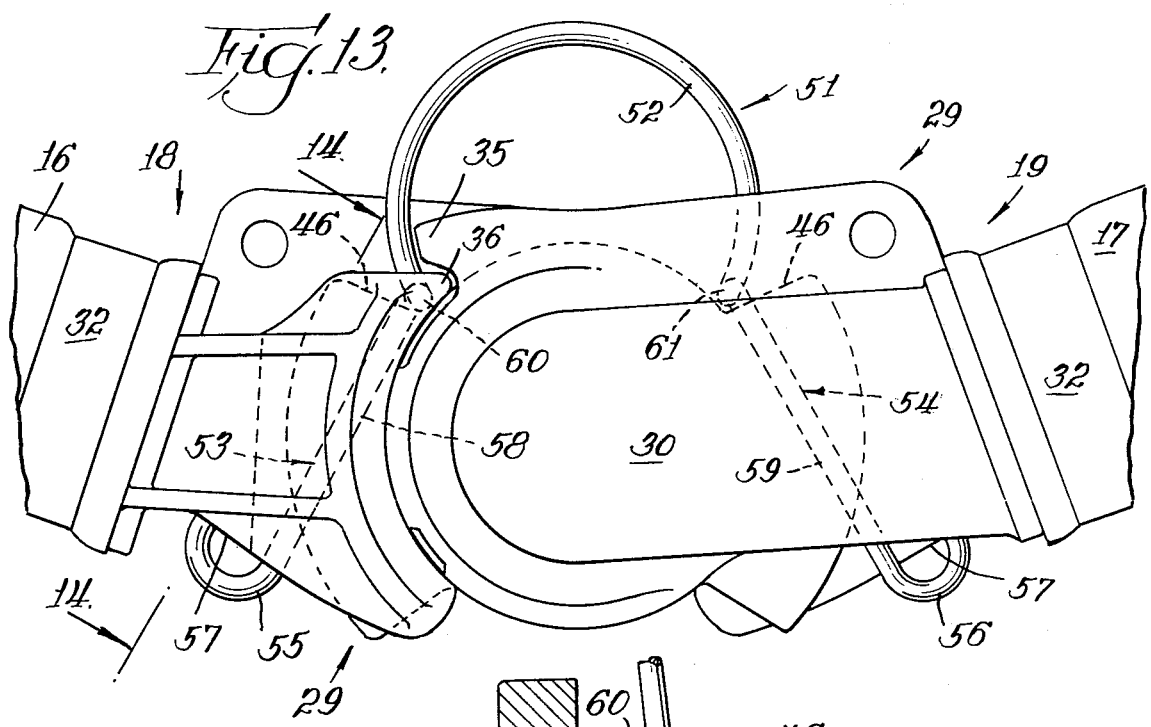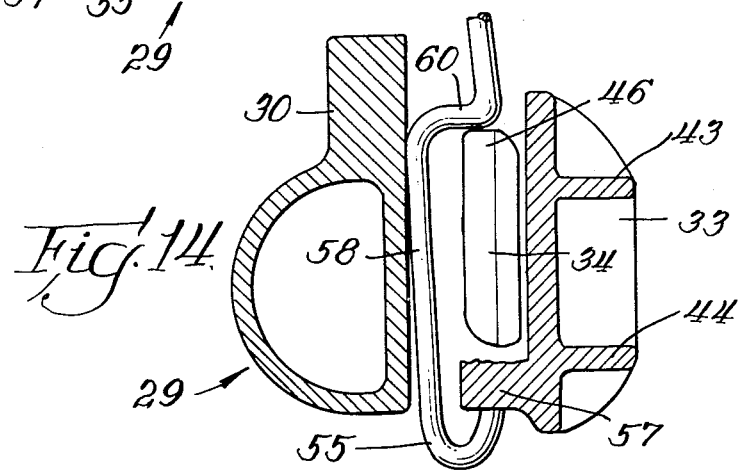

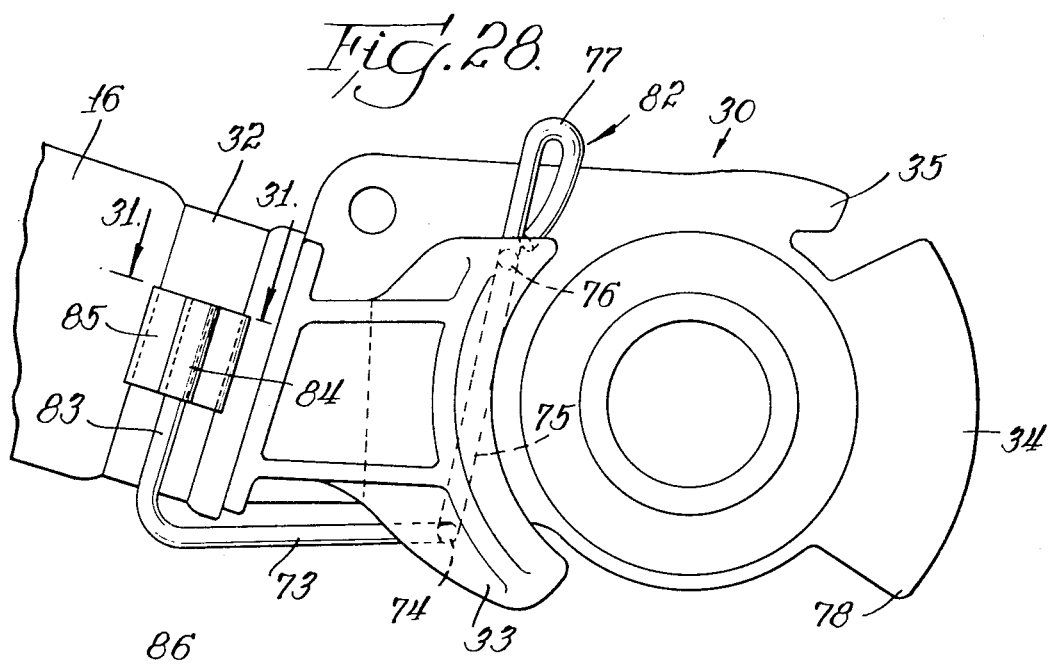
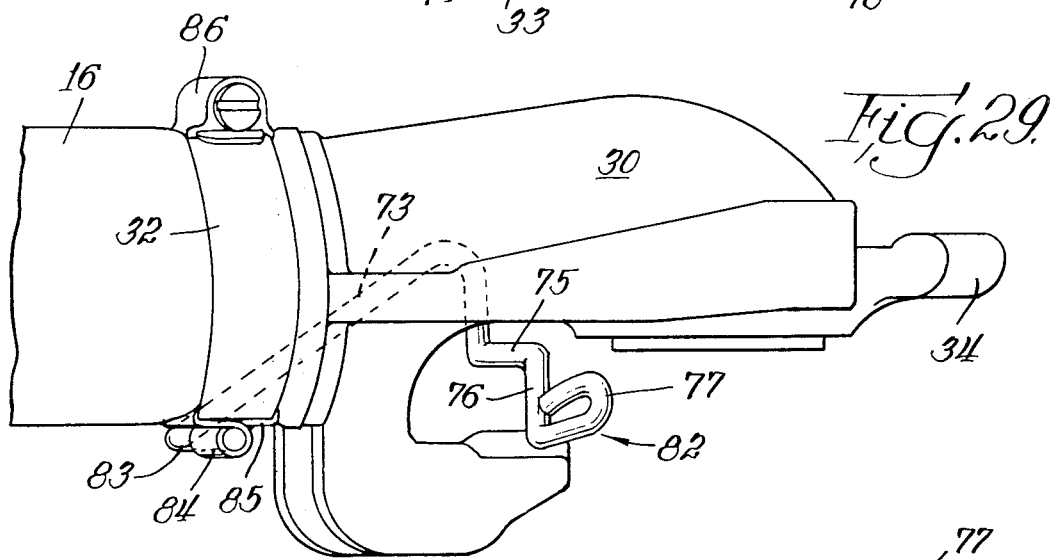
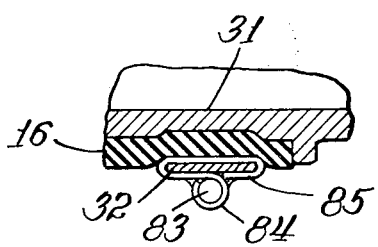
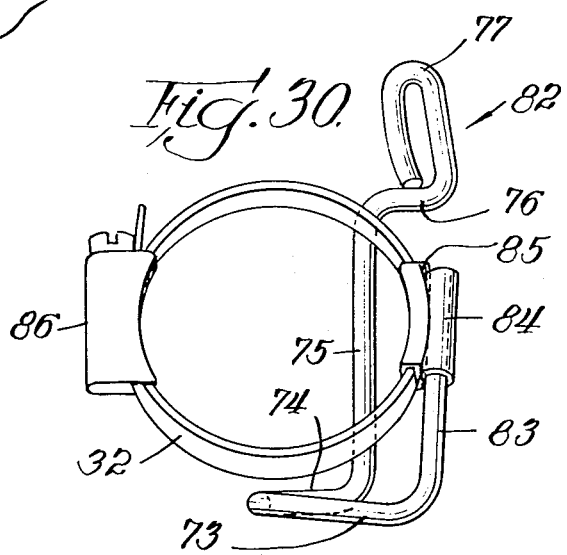

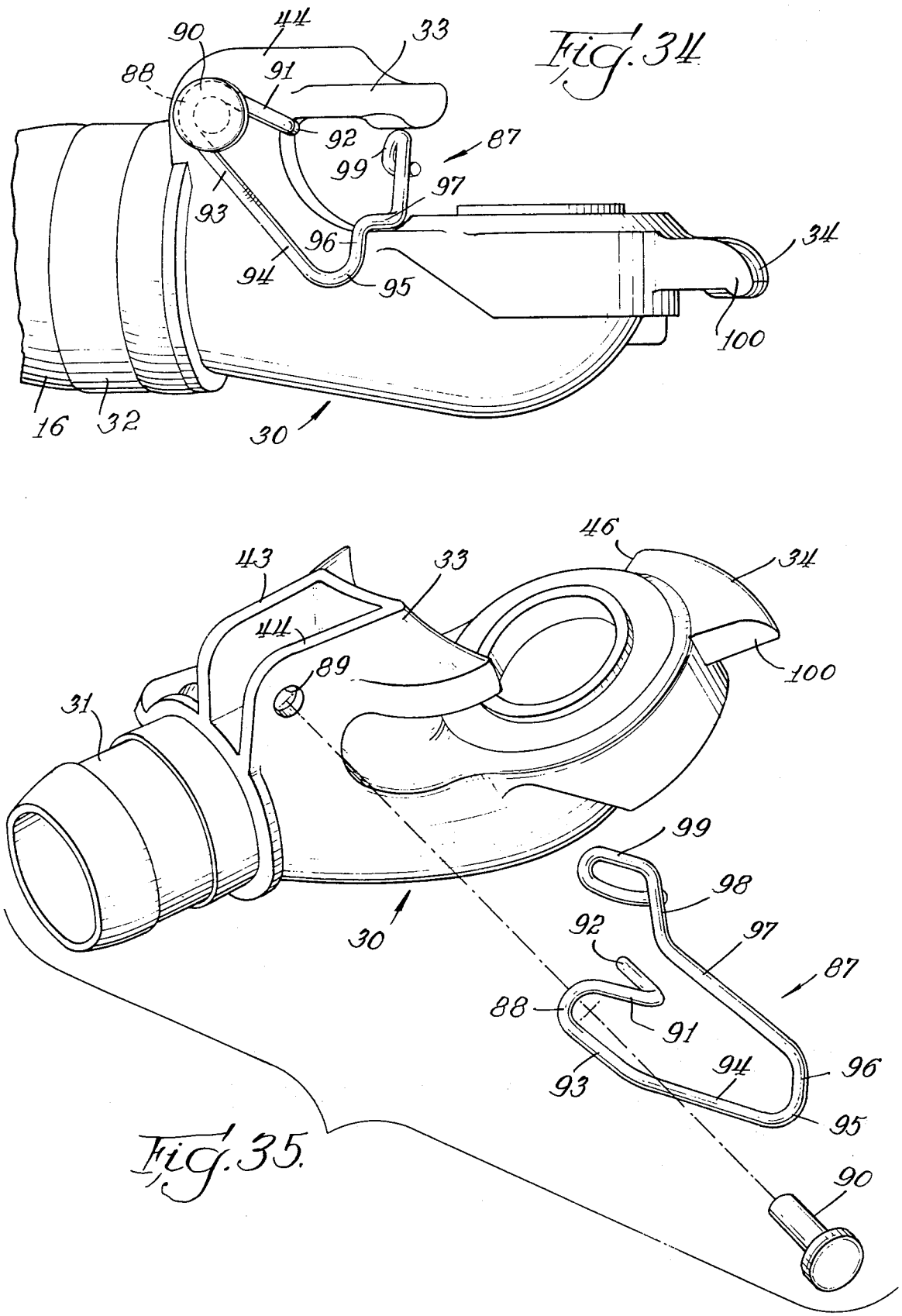

WIRE FORM LOCKING MEANS FOR DETACHABLE AIR HOSE COUPLINGS OF RAILWAY CARS

This application is a continuation-in-part of application Ser. No. 495,320, filed Aug. 7, 1974 now abandoned.

This invention relates, generally, to air hose couplings for railway cars and it has particular relation to devices to prevent accidental uncoupling thereof.

Air brake systems in use on railway freight cars utilize a flexible hose at each end of the car that is connected to adjacent cars. Ultimately this interconnection ends at the locomotive which contains the air brake controls employed by the engineer to control the train deceleration. The basis of the air brake system on present railways is the maintenance of the "train line" air pressures. The "train line" on each car terminates in flexible hose couplings of conventional construction so that any car can be connected to any other car.

The air brake system is so designed that, if there is an accidental failure anywhere in the system, all of the brakes in the entire train are automatically set. This brings the train to a rapid stop. The individual hose couplings are such that they facilitate rapid manual assembly but will automatically release by pulling apart as opposed to pivotal movement employed in their assembly. The coupling may accidentally uncouple when the train is traversing a curve. The chains that hold the couplings at a predetermined elevation can cause the couplings to pivot in an unlocking direction sufficient to completely uncouple them.

Among the objects of this invention are: To provide in a new and improved manner for preventing accidental uncoupling of air hose couplings interconnecting air hoses of coupled railway cars; to employ for this purpose a resilient wire form; to arrange for the wire form to react between the body of the one air hose coupling and the lip of the cooperating air hose coupling to prevent relative pivotal movement of the air hose couplings in an uncoupled direction; to mount a wire form as an integral part of an air hose coupling assembly; to provide for applying a disposable wire form to coupled air hose couplings after a train is made up; to arrange the wire form so that it does not interfere with the automatic uncoupling of the air hose couplings when the adjacent cars are uncoupled and they are pulled apart; to tether the disposable wire form to one of the couplings; and to mount the wire form on the clamp that secures the air hose to the coupling or to a clamp that fits over the hose clamp.

When the air hose couplings are coupled together, they are pivoted in one direction manually, the pivotal movement being limited by stops on the respective coupling bodies so that this movement cannot take place beyond a predetermined point. However, counter pivotal movement of the coupling can occur on some of the air brake hoses on modern "long travel" or cushion underframe cars. This counter pivotal movement or unlocking rotation accidentally occurs when the hoses begin to oscillate vertically as a result of forces incident to train operation. This counter pivotal movement also can be caused when the train is rounding a curve as a result of the action of a short coupler support chain or chains in being tensioned to such extent that the couplers are counter pivoted to the uncoupled position. When these actions take place a break in the "train line" occurs which is not due to mechanical failure in the sense of equipment breakage but rather is due to the accidental uncoupling of the air hose couplings.

It will be understood that the basic design of air hose couplings now in use has been standard for many years on all types of freight cars. This is essential because of the interconnection requirements of various types of railway cars.

In one embodiment of the present invention a wire form locking member is installed on the air hose and couplings subassembly prior to its application to the railway car. Thus, it becomes a permanent component and is arranged to lock automatically when the hoses are manually coupled by a relative pivotal movement. This device is so arranged as to facilitate manual disconnection of the couplings if this action is desired. A locking arm can be manipulated manually to permit the counter pivotal movement for uncoupling the air hose couplers.

Another form of the locking means comprises a bifurcated wire form which is arranged to be applied to coupled air hose couplings after a train has been made up in a train yard. It is applied by inserting it in spaces between the juxtaposed faces of the air hose couplings and is intended to drop away when the cars are uncoupled and the air hose couplings are pulled apart. This form of the locking means is relatively inexpensive and can be discarded or it can be tethered to one of the couplings for reuse.

The locking means in which this invention is embodied can be applied to existing cars by replacing the conventional hose clamp with a hose clamp extending through an anchor which carries one end of the locking means and holds it in operative position with respect to the associated air hose coupler. Further, a separate clamp can be applied over the hose clamp if the hose clamp already is applied. In the drawings:

FIG. 3 is a top plan view of conventional car couplers and shows the relative positions of the coupled air hoses when the train rounds a curve resulting in one of the support chains being tensioned, thereby causing relative uncoupling pivotal movement of the air hose couplings.

FIG. 4 is a view, in side elevation, of FIG. 3 and shows the air hose couplings pivoted toward uncoupling positions.

FIG. 5 is a top plan view of air hose couplings held in coupled relation by anti-rotation locking means non-detachably mounted on the respective coupling.

FIG. 6 is a view in side elevation of the air hose couplings shown in FIG. 5.

FIG. 7 is a sectional view taken generally along line 7—7 of FIG. 6.

FIG. 8 is a sectional view taken generally along line 8—8 of FIG. 6.

FIG. 9 is a view, in side elevation of the locking means shown in FIGS. 5, 6 and 7.

FIG. 10 is an elevational view, looking from right to left of FIG. 9.

FIG. 11 is a bottom plan view of FIG. 9.

FIG. 12 is a top plan view of coupled air hose couplers locked together by locking means applied afte the train is made up.

FIG. 13 is a view in side elevation of the arrangement shown in FIG. 12.

FIG. 14 is a sectional view taken generally along line 14—14 of FIG. 13.

FIG. 28 is a view in side elevational of an air hose coupler having the locking means mounted on the clamp band that secures the air hose to the coupler.

FIG. 29 is a top plan view of FIG. 28.

FIG. 30 is a view in end elevation of the hose clamp band with the locking means mounted thereon.

FIG. 31 is a sectional view taken generally along line 31—31 of FIG. 28.

FIG. 33 and 34 are, respectively, top and bottom plan views of FIG. 32.

FIG. 35 is an exploded perspective view of FIG. 32.

Figure 1:
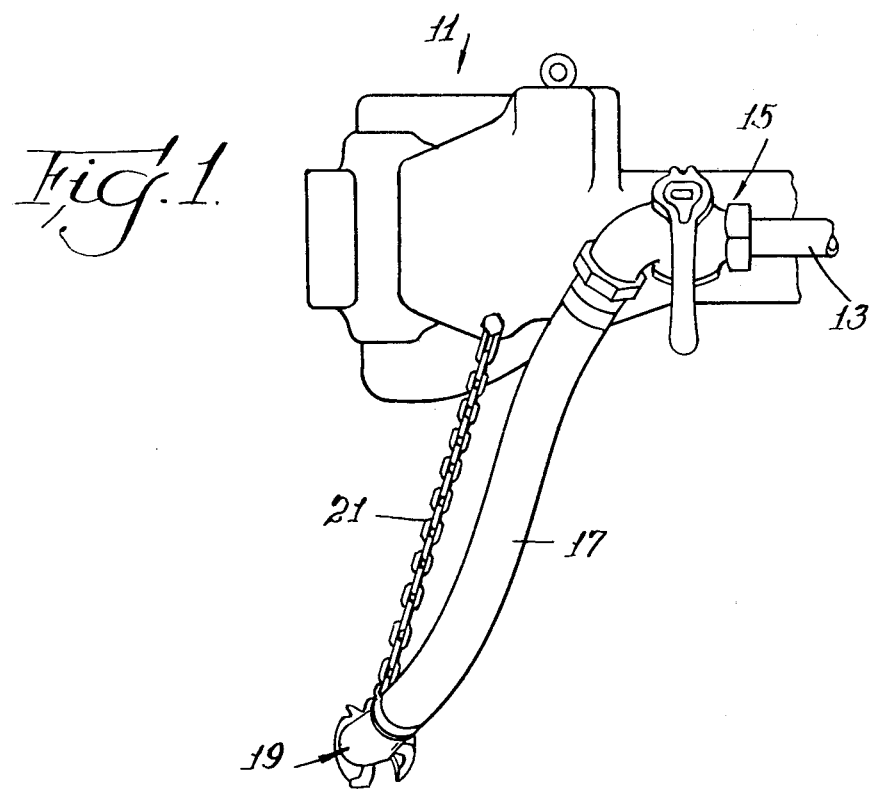
FIG. 1 is a view, in side elevation, of a conventional car coupler with the air hose supported by a chain.

In FIGS. 1-4 reference characters 10-11 designate, generally, car couplers in coupled relation. Train line pipes 12-13 terminate in angle cocks 14-15 from which flexible air hoses 16-17 extend. They terminate in glad hands or air hose couplings 18-19 which, when connected, maintain continuity of the air brake line between adjacent cars. The air hose couplings 18-19 are carried by support chains 20-21 which depend from the car couplers 10-11. When the air hose couplings 18-19 are uncoupled, the chains 20-21 support them a distance of 4 inches above the rail head (not shown).

Figure 2:
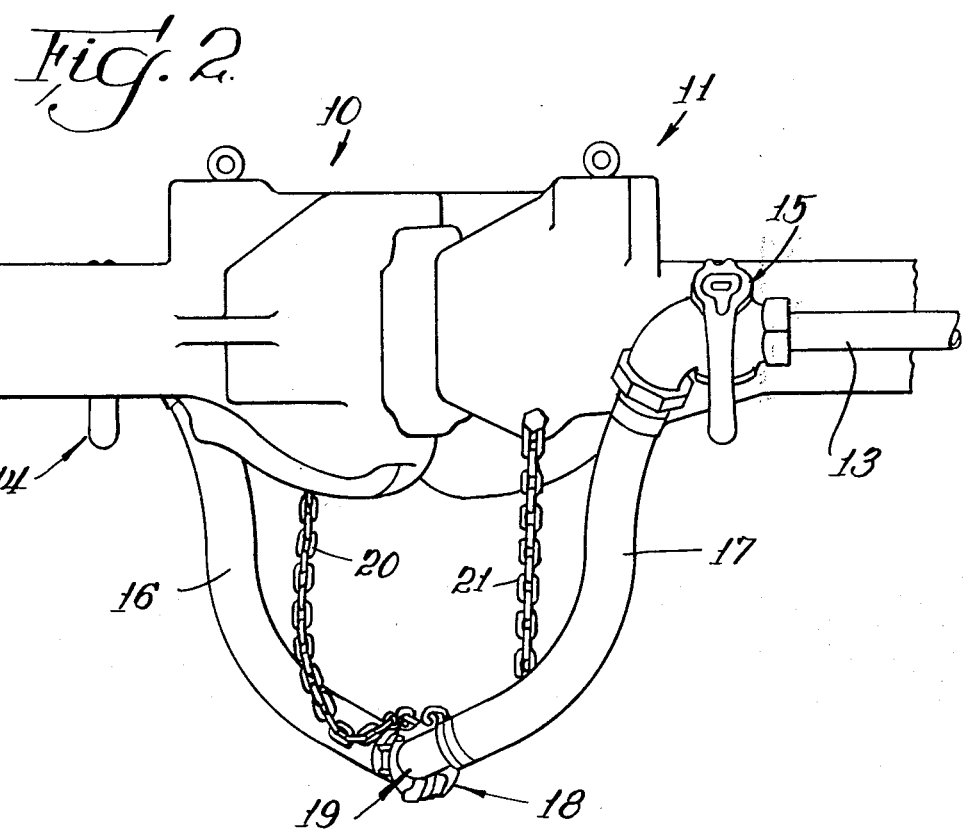
FIG. 2 is a view, in side elevation of car couplers of cushioned cars and illustrates how the coupled air hoses, with the support chains slack, can oscillate to such extent that the air hose couplers can pivot to uncoupled position.
Figure 15:
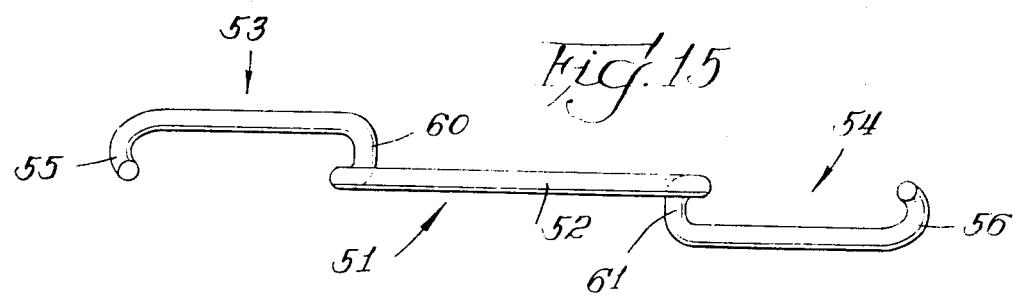
FIG. 15 is a top plan view of the locking means shown in FIGS. 12 and 13.
Figure 16:
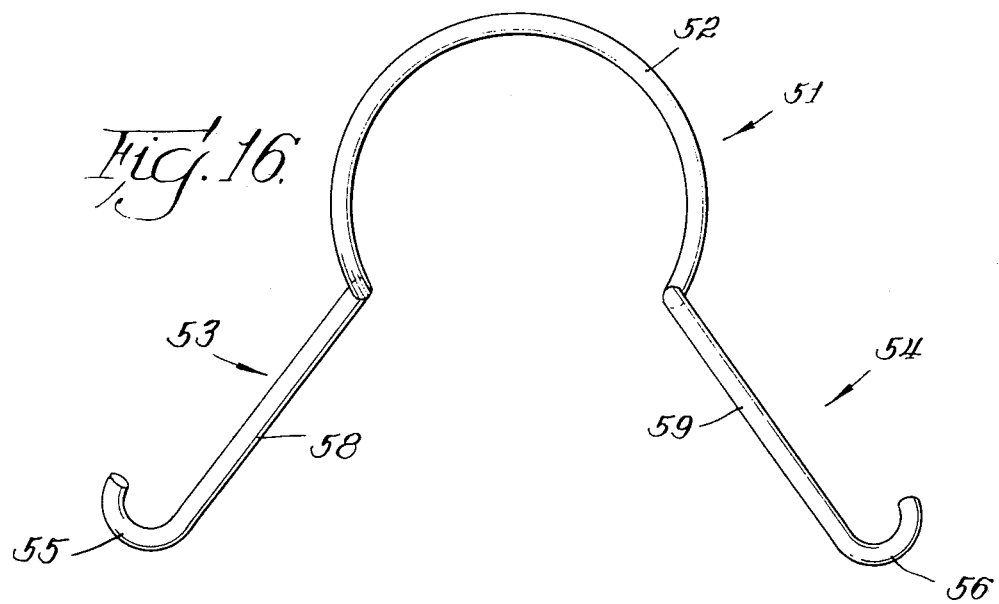
FIG. 16 is a view in side elevation of FIG. 15.
Figure 17:
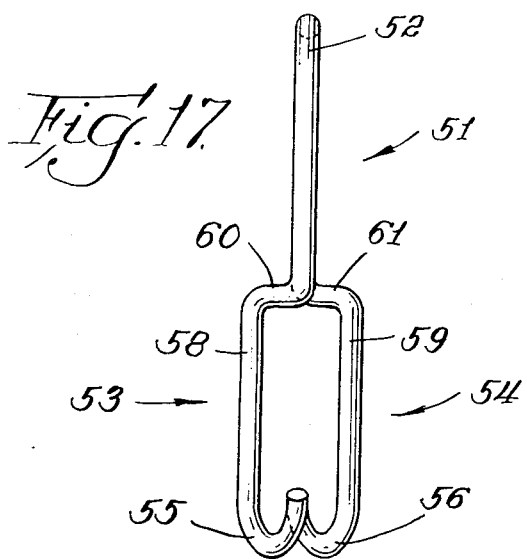
FIG. 17 is an end view of FIG. 16.

FIGS. 2 shows conditions at normal application. The chains 20-21 are slackened. The air hose couplings 18-19 can oscillate under certain conditions sufficiently far to pivot to unlocked condition whereupon the train air line is opened and the brakes are applied.

FIGS. 3 and 4 illustrate the action when the train is traversing or rounding a curve. Here the chain 20 is shown as being tensioned with the result that there is a corresponding elevation of the air hose couplings 18-19 and pivotal movement thereof in the unlocking direction. When pivoted sufficiently far in this direction, they separate, open the train air line, and effect brake application.

The air hose couplings are duplicates in construction as shown in FIGS. 5-7. Each includes a metallic body 29 having an air passageway therethrough from a nipple 31, FIG. 7, that telescopes with the respective air hose 16-17 and is secured thereto by a hose clamp band 32. Integral with the body 29 is a main body portion 30 and a guard arm 33 which overlies a laterally extending tongue or lip 34. The air hose couplings 18-19 are interconnected by inserting the lips 34 under the guard arms 33 and then pivoting them to the position shown in FIGS. 5-7. This usually is finally accomplished by stepping on the air hose couplings 18-19 to move them downwardly until stops 35-36 on the main body portions 30 and guard arms 33 engage as illustrated in FIG. 6.

All of the foregoing elements and their functioning are conventional. It remains to disclose how accidental separation of the air hose couplings 18-19 can be prevented while still permitting them to separate automatically in conventional manner when the car couplers 10-11 are uncoupled and the cars are pulled apart.

One embodiment of this invention is illustrated in FIGS. 5-11. Here each of the air hose couplings 18-19 is shown as equipped with locking means indicated, generally, at 40. It will be understood that only one of the air hose couplings 18 or 19 need be provided with the locking means 40 to accomplish the desired locking action. Each locking means 40 comprises a spring wire form fashioned, for example, from one-eighth inch diameter oil tempered wire, A.S.T.M. A229, having a phosphate finish with an oil dip.

The locking means 40 includes an intermediate circular portion 41 that is applied to the nipple 31 prior to application thereto of the air hose 16 or 17. At one end the circular portion 41 terminates in an anchor portion or extension 42 that is positioned between upstanding flanges 43 and 44 from the guard arm 33 which is an extension of the main body portion 30. The other end of the circular portion terminates in a locking arm or shoulder 45 that is arranged to react against one end 46, FIG. 8, of the lip 34 of the other air hose coupling. Because of the anchoring of the extension 42 to the main body portion 30 or more particularly to the guard arm 33 of one of the air hose couplings and the reaction of the locking arm or shoulder 45 against the end 46 of the lip 34 of the other air hose coupling, accidental separation of the air hose couplings 18-19 due to the causes hereinbefore mentioned is prevented. However, on uncoupling of the car couplers 10-11 and pulling apart thereof, uncoupling of the air hose couplings 18-19 in the normal manner is not interfered with.

In order to release manually the locking arm or shoulder portion 45 from engagement with the end 46 of the lip 34 there is provided a release arm 47 that extends from the locking arm or shoulder portion 45 and terminates in a hook 48. When it is desired to uncouple the air hose couplings 18-19 manually, the release arms 47 have pressure applied thereto, in the direction indicated by arrow 49, FIG. 6, sufficient to disengage the lips 34 and move the locking arms or shoulder portions 45 out of the paths of the lips 34, whereupon the air has couplings 18-19 can be pivoted to uncoupled positions.

FIGS. 12-17 show, generally, at 51 a one piece double locking means preferably formed of spring wire as previously described. It includes an intermediate circular section 52 from the ends of which locking sections, shown generally at 53-54, extend. They terminate in hook shaped anchores 55-56 which react against flanges 57, FIG. 14, extending from the guard arms 33 and thus are integral with the main body portions 30 of the hose couplings 18-19. The anchors 55-56 are integral with connecting sections 58-59 which extend from locking arms or shoulders 60–61 that react against the ends 46, FIG. 14, of the lips 34 and extend in opposite directions from the plane containing the section 52.

After the air hose couplings 18–19 have been pivoted into fully coupled relation, the one piece double locking means 51 is applied by inserting the locking sections 53–54 into spaces between the couplings 18–19 until the hook shaped anchor portions 55–56 snap into engagement with the flanges 57 of the guard arms 33 and the locking arms or shoulders 60–61 react against the ends 46 of the lips 34 as seen in FIG. 14. When the car couplers 10–11 are uncoupled and the cars are pulled apart, the air hose couplings 18–19 separate in the usual manner and the locking means 51 then falls to the track where it can be discarded or picked up for reuse.

Figure 18:
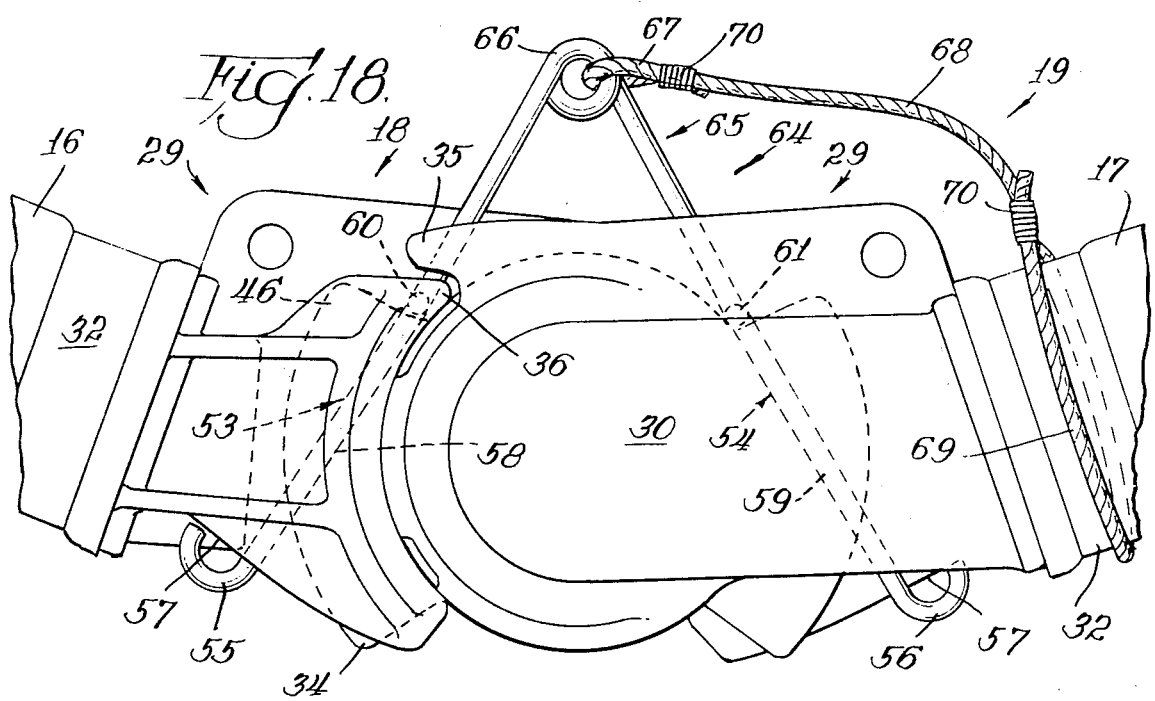
FIG. 18 is a view similar to FIG. 13 and illustrates how the locking means can be tethered to one of the hose couplings.
Figure 19:
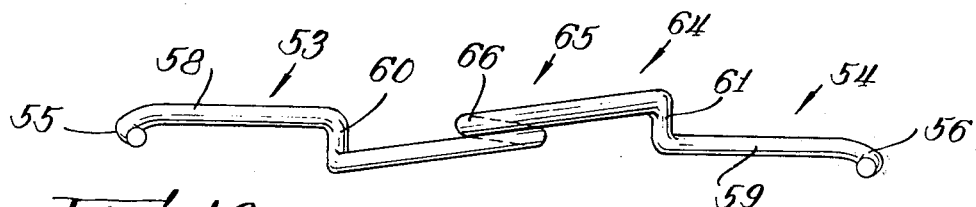
FIG. 19 is a top plan view of the locking means shown in FIG. 18.
Figure 20:
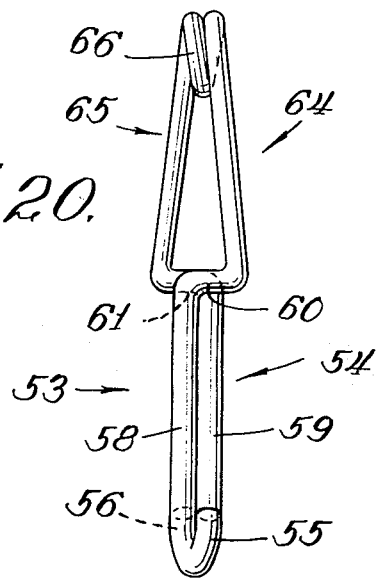
FIG. 20 is an end view of FIG. 19.

FIGS. 18–20 show, generally, at 64 a one piece spring wire double locking means that is similar to the locking means 51 except for the substitution of a V-shaped intermediate section 65 for the circular section 52. At the apex of the intermediate section 65 there is an eye 66 which is formed by a loop of the spring wire to which one end 67 of a flexible tether 68 is secured. To the other end 69 extends around one of the clamp heads 32. Clips 70 secure the ends 67 and 69 as illustrated.

FIGS. 21–27 show, generally, at 71 locking means that is similar to the locking means 40 and is formed of like material. Only one locking means 71 is illustrated since it is sufficient to lock the air hose couplings 18–19 together. Also, it is likely that only one of them is equipped with a locking means.

Figure 24:
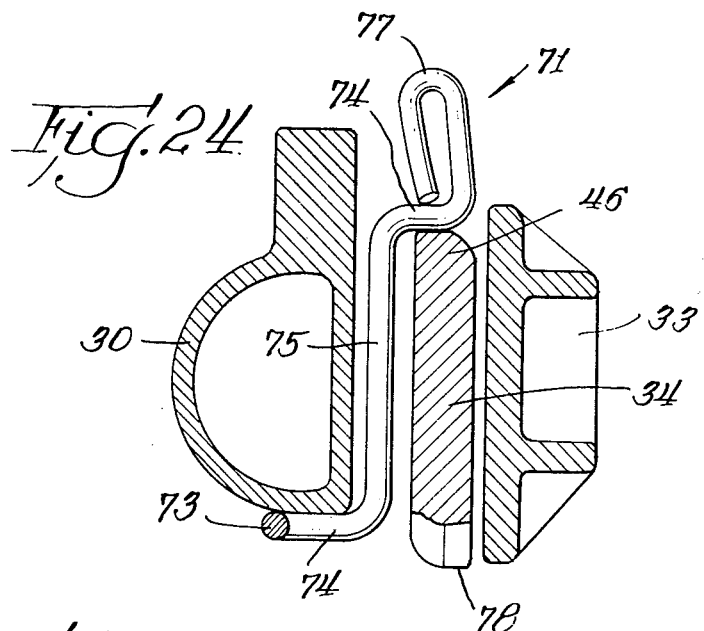
FIG. 24 is a sectional view taken generally along line 24—24 of FIG. 21.
Figures 25, 26:
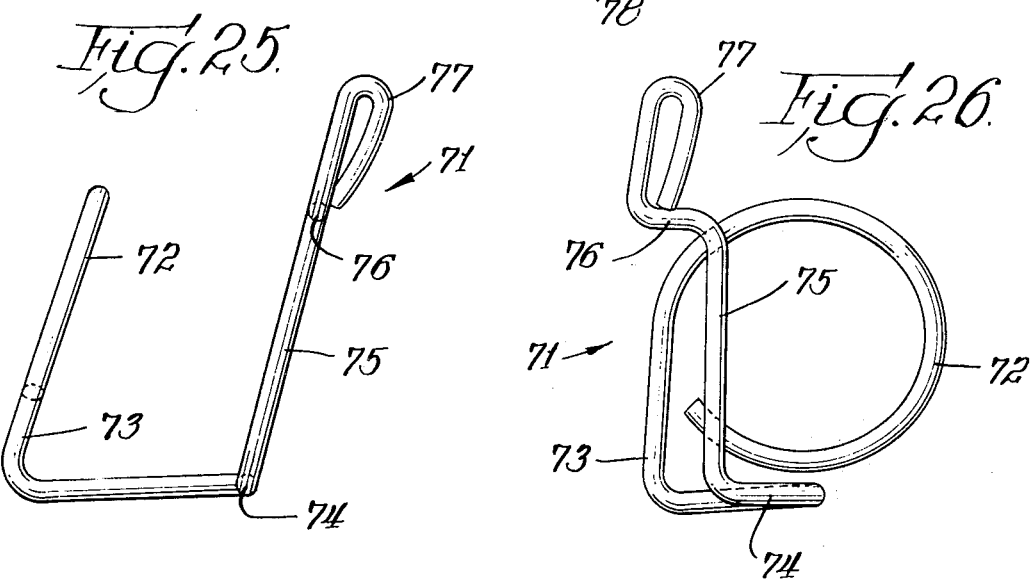
FIG. 25 is a view in side elevation of the locking means shown in FIGS. 21-24.
FIG. 26 is a view in end elevation of FIG. 25.
Figure 27:
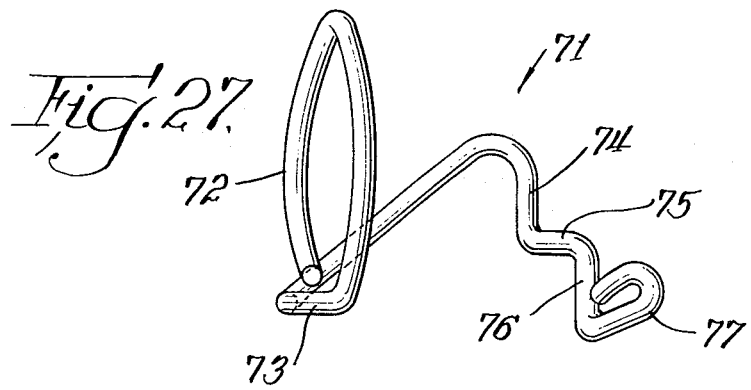
FIG. 27 is a top plan view of FIG. 25.
Figure 32:
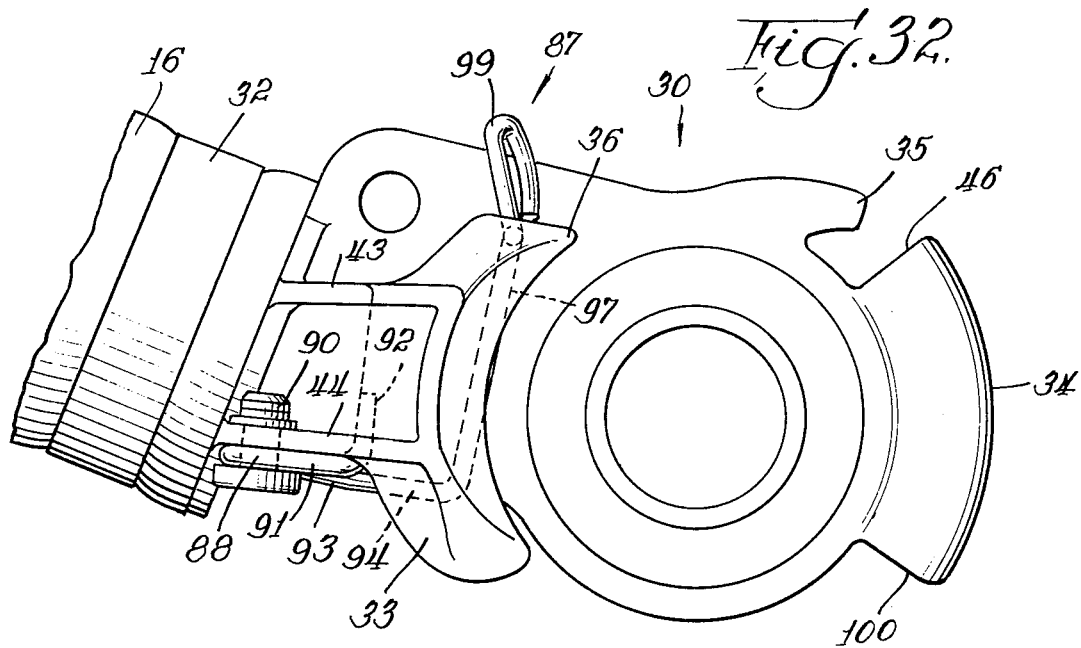
FIG. 32 is a side elevation view of an air hose coupler having locking means secured thereto.
Figure 33:
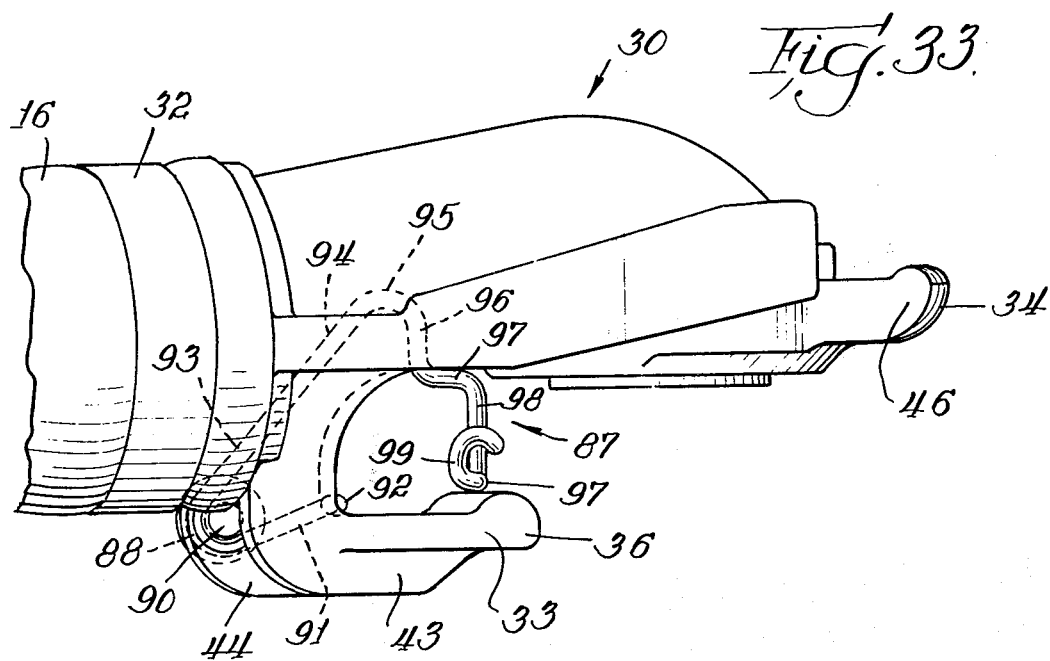

The locking means 71 includes a circular portion 72 that is assembled on the air hose coupling 18 prior to application of the air hose 16. There is a lateral extension 73 from one end of the circular portion 72 that terminates in an anchor arm 74 that reacts against a side of the main body portion 30 as illustrated in FIG. 24. From the anchor arm 74 there is a connection section 75 from which a locking arm or shoulder 76 extends to react against the end 46 of the lip 34 of the other air hose coupler thereby locking them against pivotal movement in the uncoupling direction without interferring with their being uncoupled by pulling apart of the air hoses 16–17 after the car couplers 10–11 are uncoupled. A hook 77 extends from the locking arm 76 for engagement by the other end 78 of the lip 34 when it is pivoted in the direction indicated by arrow 79, FIG. 21, to the coupled position to displace the locking means 71 to the position shown by broken lines. Subsequently the locking arm or shoulder 76 is biased to overlying locking position shown in FIG. 24.

Figure 21:
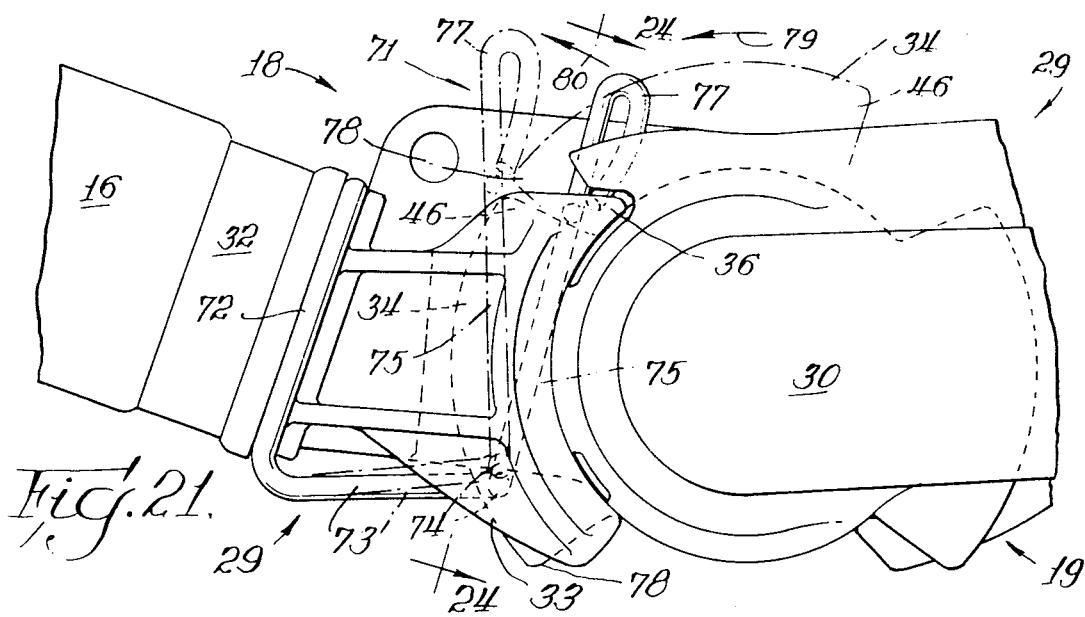
FIG. 21 is a view, similar to FIG. 6 and shows a modified form of the locking means.
Figure 22:
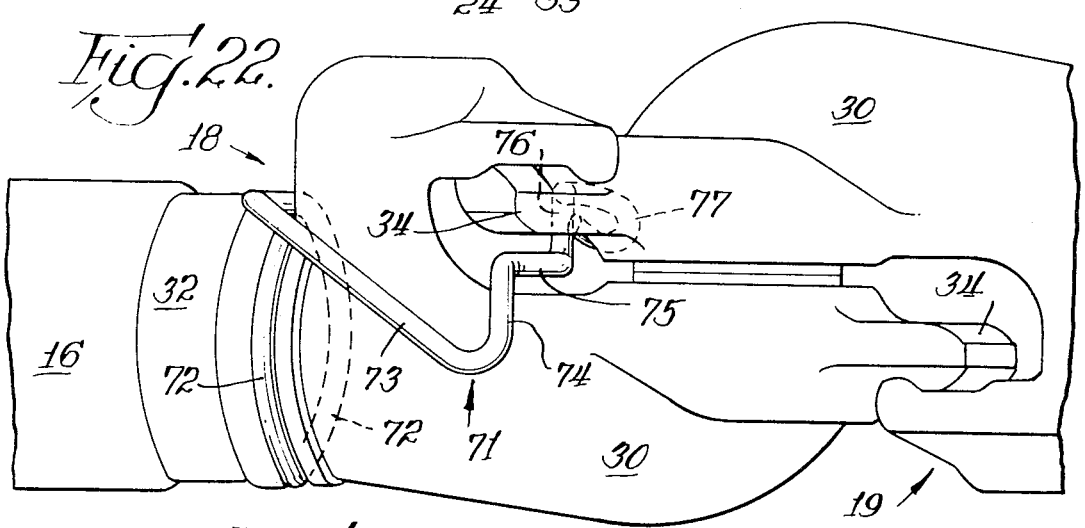
FIG. 22 is a bottom plan view of FIG. 21.
Figure 23:
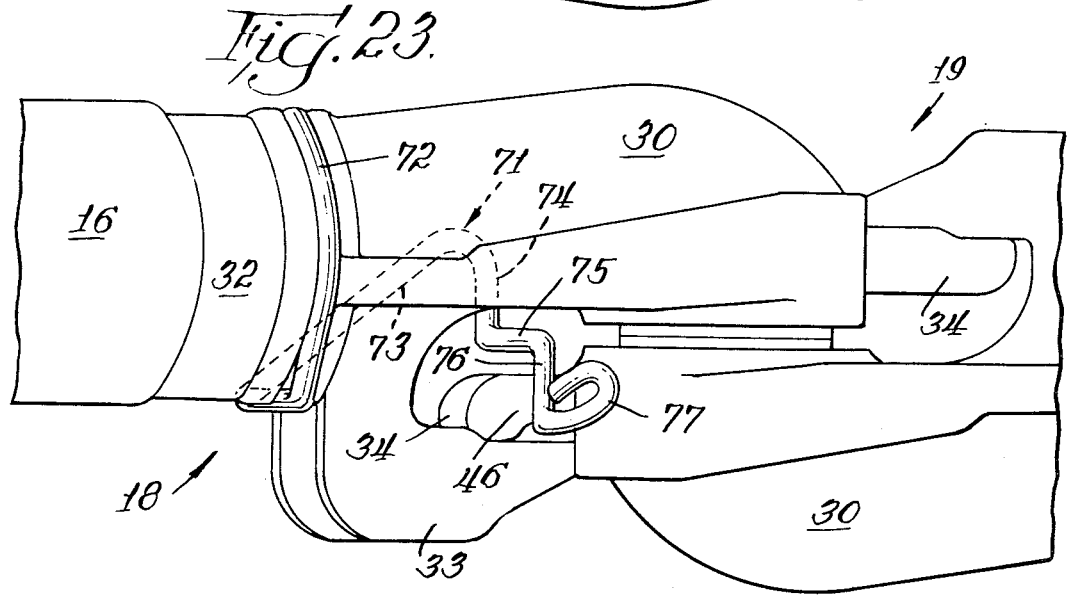
FIG. 23 is a top plan view of FIG. 21.

Also the hook 77 provides a handle for manual movement in the direction indicated by arrow 80, FIG. 21, to shift the locking arm or shoulder 76 out of engagement with the end 46 of the lip 34 and permit manual uncoupling of the air hose couplings 18–19.

FIGS. 28–31 show, generally, at 82 locking means that is similar to the locking means 71 except that the circular portion 72 is omitted and a straight portion 83 is substituted therefor. This straight portion 83 is secured to a sleeve 84 that is carried by an anchor 85 which surrounds the hose clamp band 32 and is located opposite the clamp take-up 86 therefor as shown in FIG. 30. Otherwise the locking means 82 is constructed and functions as described for the locking means 71. If the hose clamp band 32 already has been applied, a separate clamp band can be employed for mounting the sleeve 84 and the locking means 82.

FIGS. 32–35 show, generally at 87 wire form locking means that is secured at one end to a side wall of the flange 44 and is arranged to react against one end 46 of the laterally extending lip 34 from the main body portion 30 of the cooperating air hose coupling when the couplings are in operative relation as illustrated in FIGS. 2, 3 and 4. Only one locking means 87 need be provided for locking cooperating couplings against accidental pivotal movement in the uncoupling direction. Thus an air hose coupling provided with the locking means 87 can be coupled to a like air hose coupling which is not provided with locking means.

The locking means 87 includes an arcuate anchoring section 88 that is arranged to be placed around an opening 89 in the flange 44 of the guard arm 33. A blind bolt fastener 90 extends through the arcuate anchoring section 88 and the flange 44 for mounting the locking means 87 integrally with the hose coupling. While a blind bolt fastener 90 is preferred, it will be understood that other types of fastening means can be employed such as threaded bolts, rivets and the like.

From the arcuate anchoring section 88 there is a lateral extension 91 which terminates in a right angle end portion 92 that extends underneath the guard arm 33. At the other end of the arcuate anchoring section 88 there is a section 93 of the wire form which angles upwardly and terminates in another section 94 which is generally parallel to and overlies a wall of the main body portion 30. When the blind bolt fastener 90 is secured in position the section 94 is securely clamped to the wall of the main body portion 30. At the outer end of the section 94 is an arcuate section 95 that resiliently bears against the wall of the main body portion 30. It terminates in a vertical section 96 which extends to the upper surface of the main body portion 30. From the vertical section 96 there is an elongated section 97 which overlies the upper surface of the main body portion 30 and terminates in a vertical shoulder 98 for locking engagement with end 46 of the laterally extending lip 34 of an adjacent cooperating air hose coupling as will be understood readily. An eye 99 is formed integrally with a vertical shoulder 98 to facilitate manual unlocking of the locking means 87 from the end 46 of the lip 34 when it is desired to manually uncouple the hose couplings. When the air hose couplings are pivoted toward normal locking engagement the other end 100 of the laterally extending lip 34 is arranged to engage the eye 99 or the end portion thereof for displacing the shoulder 98 from the path of the lip 34 as it is pivoted to locking engagement. It will be understood that the locking means 87 is formed of spring wire of a the kind and character previously described for the locking means 40.

I claim:

1. For combination with a pair of air hose couplings at the juxtaposed ends of railway cars, said hose couplings being coupled by relative pivotal movement in a coupling direction, and likely to become uncoupled by accidental relative pivotal movement in an uncoupling direction, each hose coupling having a body and a lip latchable to the lip and body respectively of the other air hose coupling; resilient wire form locking means for reacting between the body of one air hose coupling and the lip of the other air hose coupling to prevent relative pivotal movement of said air hose couplings in said uncoupling direction, said wire form having a shoulder portion for reacting against one end of said lip and an extension for reacting against one side of said body, said wire form having a section intermediate said shoulder portion and said extension for encircling a portion of the respective air hose coupling to secure it thereto.

2. Locking means for air hose couplings according to claim 1 wherein said wire form has a laterally extending arm from said shoulder portion for manual manipulation thereof to shift it out of registry with said one end of said lip.

3. For combination with a pair of air hose couplings at the juxtaposed ends of railway cars, said hose couplings being coupled by relative pivotal movement in a coupling direction, limited by mutually engaging stops in said coupling direction, and likely to become uncoupled by accidental relative pivotal movement in an uncoupling direction, each hose coupling having a body and a lip latchable to the lip and body respectively of the other air hose coupling; resilient wire form locking means for reacting between the body of one air hose coupling and the lip of the other air hose coupling to prevent relative pivotal movement of said air hose couplings in said uncoupling direction, said wire form being bifurcated with a shoulder portion intermediate each furcation for reacting against one end of the respective lip and an extension at the distal end of each furcation for reacting against one side of the respective body.

4. Locking means for air hose couplings according to claim 3 wherein said shoulder portions extend in opposite directions from the plane of the central portion of said wire form.

5. Locking means for air hose couplings according to claim 3 wherein the central portion of said wire form is generally circular and terminates in laterally extending angularly related arms with said extensions at the distal ends thereof.

6. Locking means for air hose couplings according to claim 5 wherein said extensions are generally hook shaped.

7. Locking means for air hose couplings according to claim 3 wherein said central portion of said wire form includes an eye and a tether interconnects said eye and one of said air hose couplings.

8. For combination with a pair of air hose couplings at the juxtaposed ends of railway cars, said hose couplings being coupled by relative pivotal movement in a coupling direction, limited by mutually engaging stops in said coupling direction, and likely to become uncoupled by accidental relative pivotal movement in an uncoupling direction, each hose coupling having a body and a lip latchable to the lip and body respectively of the other air hose coupling; locking means for reacting between the body of one air hose coupling and the lip of the other air hose coupling to prevent relative pivotal movement of said air hose couplings in said uncoupling direction, and means mounting said locking means on the hose clamp of one of the respective air hose couplings.

9. For combination with a pair of air hose couplings at the juxtaposed ends of railway cars, said hose couplings being coupled by relative pivotal movement in a coupling direction, limited by mutually engaging stops in said coupling direction, and likely to become uncoupled by accidental relative pivotal movement in an uncoupling direction, each hose coupling having a body with a nipple at one end for connection to the end of an air hose and a lip projecting from the opposite end and latchable to the body of the other air hose coupling; locking means for reacting between the body of one air hose coupling and the lip of the other air hose coupling to prevent relative pivotal movement of said air hose couplings in said uncoupling direction, and means securing said locking means at one end to a side wall of said body.

10. For combination with a pair of air hose couplings at the juxtaposed ends of railway cars, said hose couplings being coupled by relative pivotal movement in a coupling direction, limited by mutually engaging stops in said coupling direction, and likely to become uncoupled by accident relative pivotal movement in an uncoupling direction, each hose coupling having a body and a lip latchable to the lip and body respectively of the other air hose coupling; locking means for reacting between the body of one air hose coupling and the lip of the other air hose coupling to prevent relative pivotal movement of said air hose couplings in said uncoupling direction, a guard arm integral with the body of each hose coupling and including a flange, and means securing said locking means at one end to said flange, said locking means having a shoulder at the other end for reacting against one end of the lip of the other hose coupling.

* * * * *